(12) United States Patent
Anderson et al.

(10) Patent No.: US 8,229,899 B2
(45) Date of Patent: Jul. 24, 2012

(54) REMOTE ACCESS AGENT FOR CACHING IN A SAN FILE SYSTEM

(75) Inventors: Owen T. Anderson, Chapel Hill, NC (US); Binny S. Gill, San Jose, CA (US); Leo Luan, Saratoga, CA (US); Manuel V. Pereira, III, Gilroy, CA (US); Geoffrey A. Riegel, Santa Cruz, CA (US)

(73) Assignee: International Business Machines Corporation, Armonk, NY (US)

( * ) Notice: Subject to any disclaimer, the term of this patent is extended or adjusted under 35 U.S.C. 154(b) by 14 days.

(21) Appl. No.: 12/706,233

(22) Filed: Feb. 16, 2010

(65) Prior Publication Data
US 2010/0205156 A1    Aug. 12, 2010

Related U.S. Application Data

(62) Division of application No. 10/864,605, filed on Jun. 10, 2004, now Pat. No. 7,685,128.

(51) Int. Cl.
*G06F 17/00* (2006.01)
(52) U.S. Cl. ......... 707/690; 709/217; 707/694; 707/827
(58) Field of Classification Search .................. None
See application file for complete search history.

(56) References Cited

U.S. PATENT DOCUMENTS

| | | | | |
|---|---|---|---|---|
| 5,469,453 A * | 11/1995 | Glider et al. | ................ | 714/6.12 |
| 5,706,510 A * | 1/1998 | Burgoon | ................ | 707/999.203 |
| 5,915,253 A * | 6/1999 | Christiansen | ................ | 706/47 |
| 5,987,506 A * | 11/1999 | Carter et al. | ................ | 709/213 |
| 5,991,760 A * | 11/1999 | Gauvin et al. | ................ | 707/1 |
| 6,021,413 A * | 2/2000 | Vaduvur et al. | ................ | 707/201 |
| 6,202,132 B1 * | 3/2001 | Islam et al. | ................ | 711/141 |
| 6,240,416 B1 * | 5/2001 | Immon et al. | ................ | 707/1 |
| 6,385,625 B1 * | 5/2002 | Slaughter | ................ | 707/201 |
| 6,446,088 B1 * | 9/2002 | Vaduvur et al. | ................ | 707/201 |
| 6,480,970 B1 * | 11/2002 | DeKoning et al. | ................ | 714/6.12 |
| 6,804,674 B2 * | 10/2004 | Hsiao et al. | ................ | 707/1 |
| 6,985,914 B2 * | 1/2006 | Venkatesh et al. | ................ | 707/2 |
| 7,017,084 B2 * | 3/2006 | Ng et al. | ................ | 714/45 |
| 7,272,613 B2 * | 9/2007 | Sim et al. | ................ | 709/223 |
| 7,529,784 B2 * | 5/2009 | Kavuri et al. | ................ | 707/204 |

(Continued)

OTHER PUBLICATIONS

Ohlson, "Compaq is Striving for Greater Storage Visibility," Computerworld, May 8, 2000; 3pgs.

(Continued)

*Primary Examiner* — Christyann Pulliam
(74) *Attorney, Agent, or Firm* — IP Authority, LLC; Ramraj Soundararajan

(57) ABSTRACT

A system and method is disclosed for maintaining, in a Storage Area Network (SAN), the consistency of a local copy of a remote file system sub-tree obtained from a remote source. Directory structure of the remote file system sub-tree is mapped to a remote container attached to the SAN and each remote object of the remote file system sub-tree is represented as a local object component of the remote container. Next, each of the local objects are labeled with attributes associated with the represented remote object, and metadata describing each of the local objects is stored in a metadata server. Also, a consistency policy is associated with each of the local objects in the remote container (wherein the policy defines conditions for checking freshness of said labeled attributes), and the local object components of remote container is updated in accordance with the consistency policy.

25 Claims, 12 Drawing Sheets

U.S. PATENT DOCUMENTS

| | | | |
|---|---|---|---|
| 7,552,197 B2 * | 6/2009 | Soltis | 709/217 |
| 7,580,950 B2 * | 8/2009 | Kavuri et al. | 707/103 |
| 7,685,128 B2 * | 3/2010 | Anderson et al. | 707/770 |
| 2002/0083120 A1 * | 6/2002 | Soltis | 709/200 |
| 2002/0133491 A1 * | 9/2002 | Sim et al. | 707/10 |
| 2003/0028695 A1 * | 2/2003 | Burns et al. | 710/200 |
| 2003/0033308 A1 * | 2/2003 | Patel et al. | 707/10 |
| 2003/0037061 A1 * | 2/2003 | Sastri et al. | 707/103 R |
| 2003/0093567 A1 * | 5/2003 | Lolayekar et al. | 709/246 |
| 2007/0094378 A1 * | 4/2007 | Baldwin et al. | 709/223 |

OTHER PUBLICATIONS

"Distributed Storage Tank for Grid," Storage and Data Grid Projects Presentations to the EMEA Grid Team; May 27, 2003; 27pgs.

Braam, "Lustre: Scalable Clustered Object Storage," Cluster File Systems, Inc.; Jun. 6, 2002; 48pgs.

"SAN File System: Lower Storage Management Costs and Enhance Productivity," (avail. on web Oct. 15, 2003) (avail. at http://www.storage.ibm.com/software/virtualization/sfs/, accessed Oct. 17, 2003); 2pgs.

Shepard et al., "SGI InfiniteStorage Shared Filesystem CXFS: A High Performance, Multi-OS Filesystem from SGI," white paper, Aug. 21, 2003; 19pgs.

Menon et al., "IBM Storage Tank—A Heterogeneous Scalable SAN File System," IBM Systems Journal, V42, N2, 2003, (avail. on web in Apr. 2003) (avail. at http://www.research.ibm.com/journal/sj/422/menon.html, accessed Oct. 30, 2008); 18pgs.

"Distributed Storage Tank," IBM Almaden Research Center, (avail. at http://www.almaden.ibm.com/storagesystems/GRID/distributed_storage_tank/index.shtml, accessed Oct. 17, 2003); 1pg.

* cited by examiner

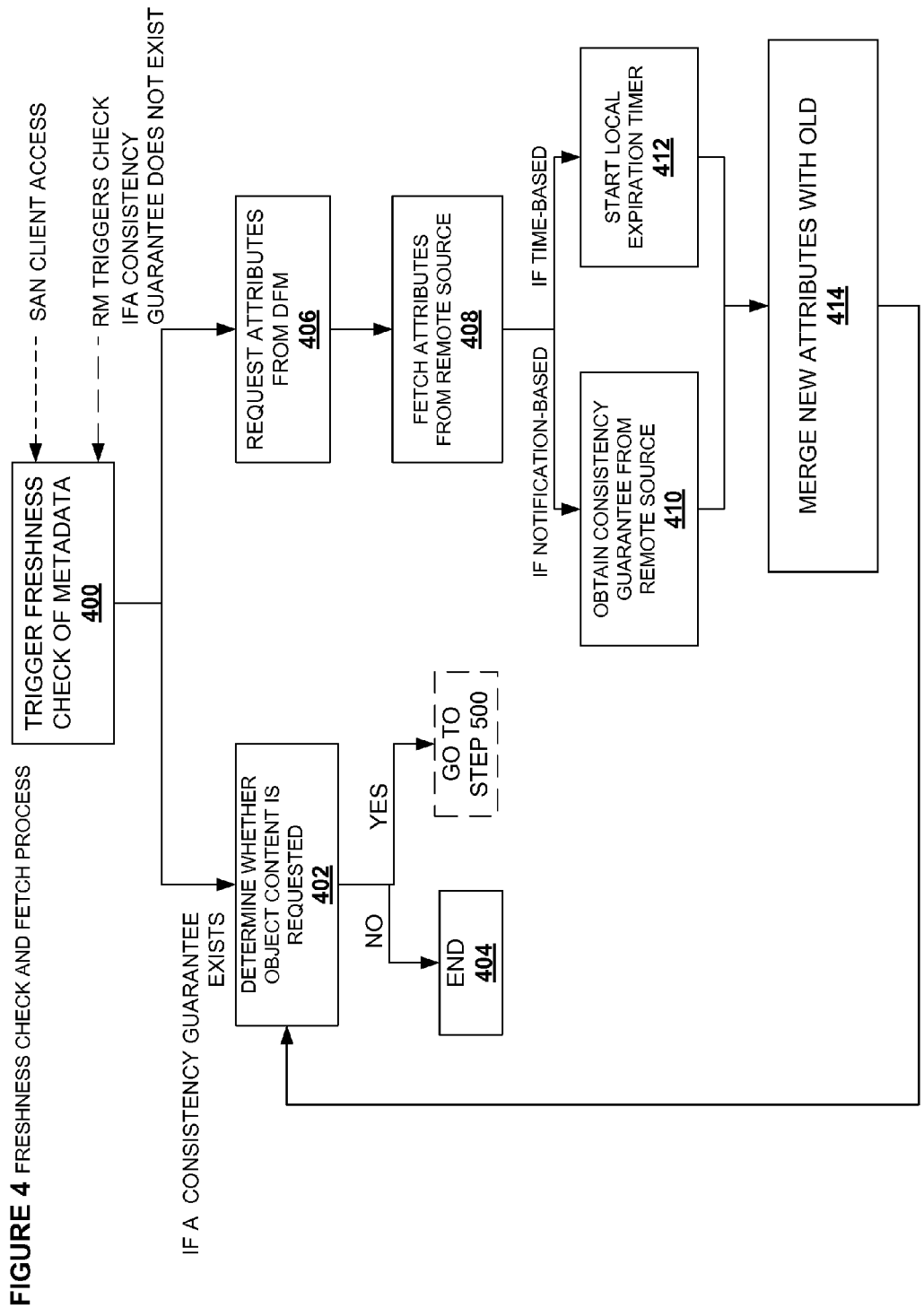

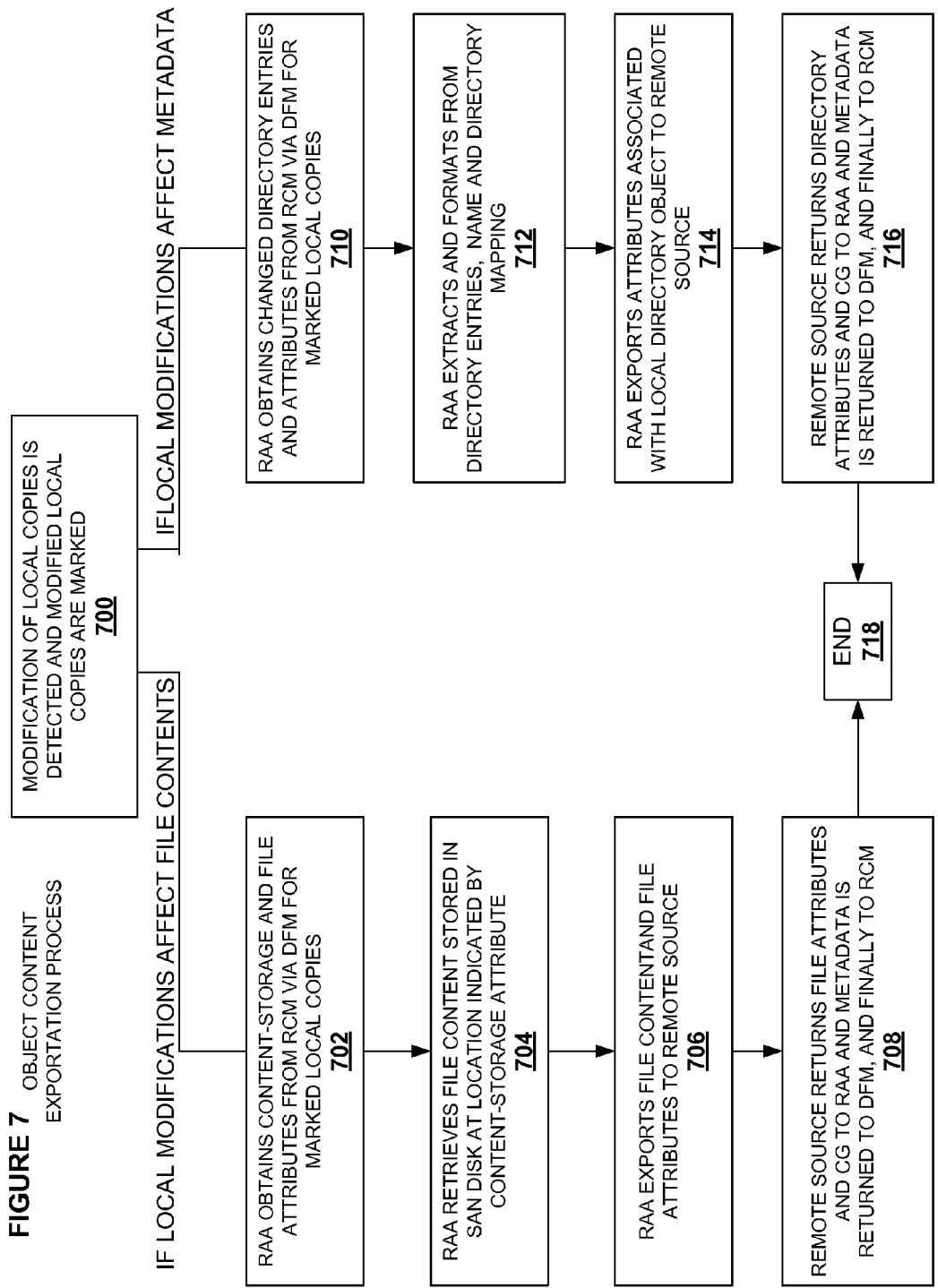
FIGURE 7 OBJECT CONTENT EXPORTATION PROCESS

REMOTE ACCESS AGENT FOR CACHING IN A SAN FILE SYSTEM

RELATED APPLICATIONS

This application is a divisional application of pending U.S. application Ser. No. 10/864,605 filed Jun. 10, 2004.

BACKGROUND OF THE INVENTION

1. Field of Invention

The present invention relates generally to the field of file sharing. More specifically, the present invention is related to remote file system caching.

2. Discussion of Prior Art

In a Storage Area Network (SAN), a SAN file system is used to provide high-performance access to large file systems. A SAN file system is a type of cluster file system in which both clients and servers are connected to a SAN. Sometimes client and server roles are combined symmetrically in a single machine, as in the case of GPFS, and sometimes these functional roles are partitioned onto distinct machines, as in the case of Storage Tank (ST). Two key characteristics of SANs affect systems in which all participants are required to have SAN access. First, a SAN has a restricted geographical extent, thus limiting it to a relatively small campus. Second, participating hosts must be trusted not to corrupt file system data.

However, users and applications are often distributed over a large area or are contained within administrative domains that do not fully trust each other. In these situations, a bridge is needed to allow file sharing across Wide Area Networks (WAN), administrative domains, or both. The two ends of the bridge, namely, the import and export sides, generally have different characteristics. The bridge can be constructed at the file-level above a SAN file system or at the block-level below it. Issues requiring consideration include security, performance, and administration. A WAN admits a much larger range of trust and has different threat models than a SAN. Therefore, strong security and a flexible approach to integration and interface with multiple domains are necessary to ensure data availability and authenticity. Additional provisions are necessary to account for performance parameters unique to a WAN, in specific, higher latencies and limited bandwidth.

Issues associated with exporting data from a SAN file system can be addressed by using an existing distributed file system protocol. For example, a node of a General Parallel File System (GPFS) could run a Network File System (NFS) or Samba server, which could, in turn, deliver SAN file system data to remote users. These protocols are widely implemented, but are not well adapted to a WAN environment. A more suitable protocol, such as Andrew File System (AFS) or Distributed File System (DFS), could be used. While a DFS server has been integrated, albeit in a limited way, with GPFS on AIX, it is not available for any other SAN file systems, nor has AFS been ported to such an environment.

A complementary task is importing remote data into a SAN file system so that local applications have access to it. Machines acting as clients of a SAN file system (e.g., ST clients or GPFS nodes) can individually run distributed file system clients, such as NFS or AFS, but forgo many of the benefits of a SAN file system. Features missing from these discrete solutions include centralized administration and management, uniform namespace, shared caching, and reduced WAN usage.

Another approach to circumventing SAN distance limitations is to use an IP-compatible storage protocol such as Internet Small Computer System Interface (iSCSI). This gives a SAN file system the capability to expand geographically and include constituents distributed over a WAN. Issues associated with this approach are generally due to performance and scaling. Software for storage systems designed to benefit from low latencies of a SAN may require redesign when faced with much larger WAN latencies and an expanded set of more complex failure modes. A SAN file system that spans a large geographical area will generally have more network constituents, which can challenge the scaling abilities of a file system's architecture. Specifically, cluster algorithms controlling file system metadata consistency may behave poorly when the number of network constituents increases. Additionally, distributed network constituents may necessitate the use of security model that is not as restricted as that of a SAN.

Therefore, there is a need in the art to address data importation from a remote source and data exportation to a remote source. There are at least two problems with performing these tasks within the context of a file server, specifically, within the same process. First, transferring file data imposes large network and disk loads on the server, which can severely impact its performance on other tasks. Second, supporting multiple protocols necessary to communicate with a variety of remote sources can lead to software compatibility issues, maintenance problems, and large executable footprints.

Existing strategies that address some aspects of this concern by decoupling metadata handling from the burden of transferring file contents include File Transfer Protocol (FTP), SAN third-party backup, and HSM using DMAPI. FTP transfers data using distinct control and data channels. Thus, a separate agent operating at the file-level handles file contents. However, because FTP operates at the file-level, it is limited in that it cannot support decoupled metadata and file contents in a SAN File System.

SAN-based backup systems, such as Veritas™, Pathlight™, and Legato/Celestra™, alleviate server load by providing server-less backup. These systems utilize a SAN environment to copy data between storage devices, such as disk to tape, using a block-level interface such as Small Computer System Interface (SCSI). They are limited, however, in that they do not provide for file system interaction and thus, do not provide file-level access to data residing on either a SAN or across a WAN.

Hierarchical storage management systems gained additional portability and interchangeability with the development of the Data Management API (DMAPI). This interface allows the kernel to intercept references to selected portions of a file system and pass them to a user space DM application. Access to data is allowed at the file-level through the file system, so it does not support a remote DM application nor does it take advantage of a SAN environment to offload file server machines.

The present invention has wide applicability since it makes limited assumptions about the architecture of a SAN file system and does not make extreme performance demands on a WAN.

Whatever the precise merits, features, and advantages of the above cited references, none of them achieves or fulfills the purposes of the present invention.

Definitions And Terms

WAN (Wide Area Network)—a network characterized by long distances, 25 kilometers or more, generally large latencies, often greater than fifty milliseconds; and relatively low bandwidths, less than ten megabytes per second.

SAN (Storage Area Network)—an environment consisting of hosts, storage devices, and a high-speed network optimized for data transfer.

SAN users—are users or applications running on SAN file system client hosts.

SAN disks—are storage devices attached to a SAN.

SAN file system—is characterized by a distributed or clustered architecture in which clients access file contents directly from SAN disks and servers mediate metadata access.

storage objects—are a variably-sized abstraction exported by object-based storage devices providing a higher level interface than fixed-sized blocks.

object-based storage device—allows access to a pool of variably-sized storage objects instead of an array of fixed-sized block.

attributes—named properties stored with file system objects, aside from their contents.

container—a collection of file system objects organized into a single-rooted hierarchy of directories.

directory—a collection of mappings between names and file system objects.

file—a file system object with attributes whose contents are stored in an array of bytes; contents are sometimes divided logically into fixed-sized pieces called blocks.

metadata—a term that refers to all file system data except file contents, specifically object attributes, content storage attributes, and directory mappings.

consistency guarantees—dynamic state information shared between a client and server regarding file system data copies held by a client.

aggregate—a grouping of file system objects, such as members of a container or the children of a directory.

cache and replica—collections of local copies of remote file data. A cache is a partial set selected and validated by local demand. A replica is a well-defined subset validated asynchronously.

data—when used without qualification means file system data, both metadata and file contents, generally referring to all the persistent parts of a file system: all the objects, their attributes and contents.

object—a file, directory, symbolic link, or other file system resident entity which has a user-visible name.

remote container—a sub-tree of a remote file system attached to the local file system namespace as if it were a locally resident container.

attachment—a special file system object that joins the namespaces of two containers forming a connection to the root of a target container.

distant source—a file system accessible via a WAN.

foreign source—a file system accessible via network other than a SAN remote source—a repository of file data accessible over a network referring collectively to both distant and foreign sources.

network file access protocol—a communication protocol for accessing a remote source over a network.

network file access client—software implementing the client side of a network file access protocol.

SUMMARY OF THE INVENTION

The present invention provides for a method for maintaining, in a Storage Area Network (SAN), the consistency of a local copy of a remote file system sub-tree obtained from a remote source, wherein the method comprises the steps of: mapping directory structure of the remote file system sub-tree to a remote container (i.e., a remote container attached to the SAN), representing each remote object of the remote file system sub-tree as a local object component of the remote container, labeling each of the local objects with attributes associated with the represented remote object, storing metadata describing each of the local objects in a metadata server; associating a consistency policy with each of the local objects in the remote container (wherein the policy defines conditions for checking freshness of said labeled attributes), and updating the local object components of remote container in accordance with the consistency policy.

The present invention also provides a system for updating, storing, and accessing, in a Storage Area Network (SAN), a local copy of file system data from a remote source, wherein the system comprises: (a) a client interface, connected to a SAN client, sending to and receiving from the SAN client, metadata and a request for access to the local copy; (b) a remote container module connected to the client interface; the remote container module managing consistency of the local copy and processing the request; (c) a cache manager connected to the remote container module managing and allocating storage space for the local copy; (d) a replica manager connected to the remote container module; the replica manager maintaining consistency of the local copy if validation is asynchronous type; (e) a distributed file manager connected to the remote container module; the distributed file manager updating the local copy by obtaining the remote source file system data; and (f) a consistency policy maintenance framework connected to the remote container module, the distributed file manager, the replica manager, and the cache manager, wherein the consistency policy maintenance framework stores conditions governing consistency management of the local copy.

BRIEF DESCRIPTION OF THE DRAWINGS

FIG. 4 is a freshness check and fetch process flow diagram.

FIG. 7 is a process flow diagram illustrating object content exportation to a remote source.

DESCRIPTION OF THE PREFERRED EMBODIMENTS

Figure 1:
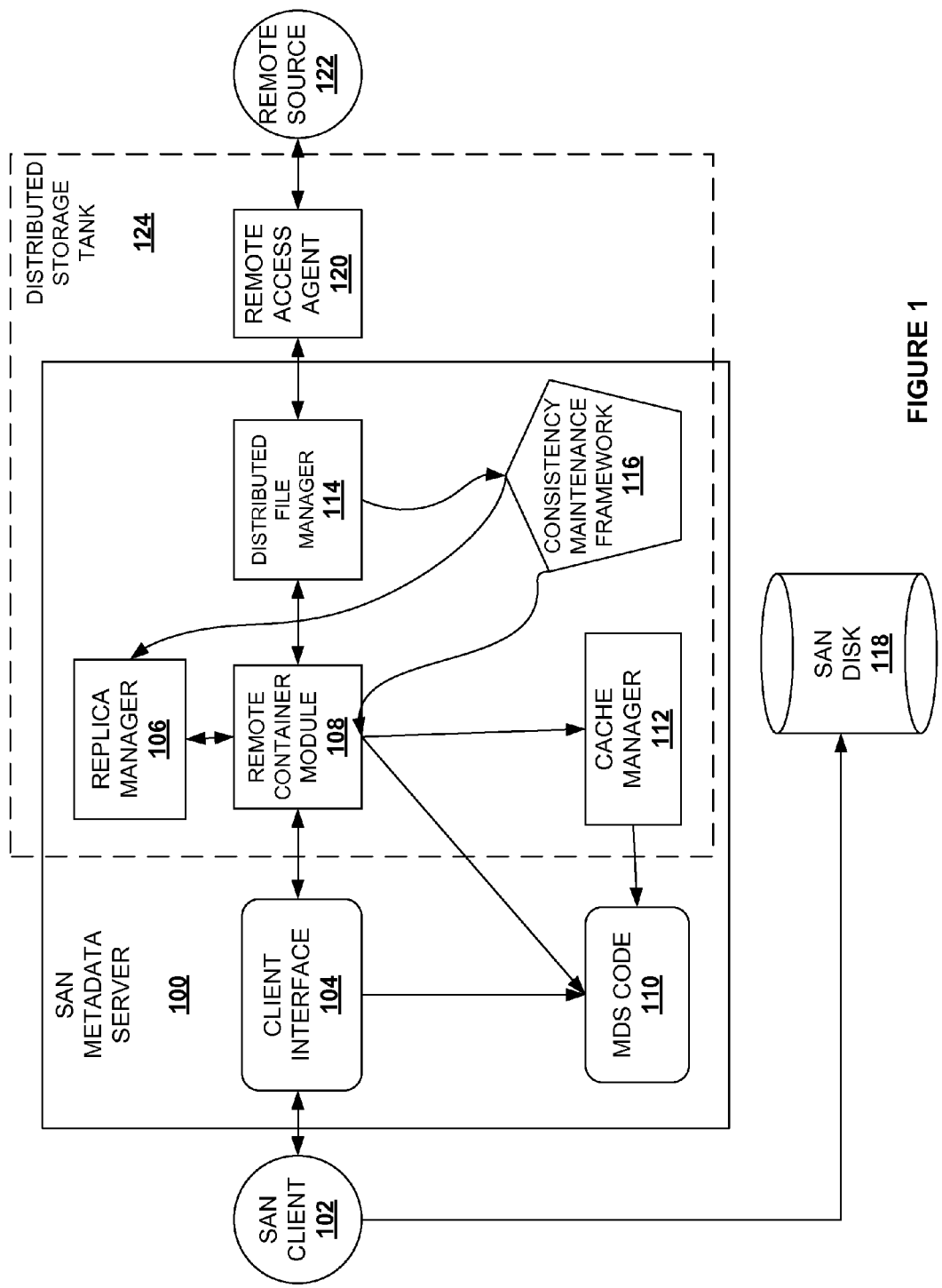
FIG. 1 illustrates a general system diagram of the present invention.

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

FIG. 1 illustrates a general system diagram of the present invention comprising MDS 100, SAN client 102, SAN disk 118, remote source 122, and DST 124. DST 124 modifies a SAN file system MDS to store as a remote container, a remote file system directory exported by remote source 122. Stored on SAN disk 118, are caches and replicas, collectively called local copies, of file system objects obtained from a plurality of remote sources 122. DST 124 maintains local copies of remote file system directory and file contents by initializing and updating copies after modifications occur. Read requests from SAN client 102 for data in a remote container are received by MDS 100 at client interface 104 and are redirected to DST 124. DST 124 determines if the requested object is present, namely available as a local copy in cache or replica storage. If the requested object is present, DST 124 verifies the validity of requested object. Verifying the validity of requested object may require contacting remote source 122, from which requested data was initially obtained. If the requested data is invalid or not present, DST 124 fetches the requested file system object from remote source 122.

MDS 100 is further comprised of client interface 104, Replica Manager (RM) 106, RCM 108, MDS Code 110, CM 112, Distributed File Manager (DFM) 114, and Consistency Maintenance Framework (CMF) 116. Further comprising DST 124, outside of MDS 100, is RAA 120. SAN client 102 requests data through client interface 104 of MDS 100. Client interface 104 forwards remote container request to RCM 108. RCM 108 determines whether requested object is available as a local copy by checking metadata describing the storage of local copies in SAN disks, or a content-storage attribute. If a requested object is present as a local copy, its validity is verified in accordance with a consistency policy stored in CMF 116. A validity check performed by RCM 108 is comprised of two parts, a local check and an optional remote check. A local check determines either the existence of a consistency guarantee or that remote source 122 has been consulted within a specified time bound. Steps implemented in a local check are obtained from CMF 116. However, if a consistency guarantee does not exist or remote source 122 has not been consulted recently, communication with remote source 122 via DFM 114 and RAA 120 is initiated. Remote source 122 is contacted to determine whether a file system object has been modified at remote source 122, and if it has, a corresponding local copy of the object is marked as being invalid.

If the requested object is not valid or not present as a local copy, RCM 108 forwards an object request to DFM 114 which in turn forwards object data request to RAA 120. Thus, DST 124 obtains requested file system object from remote source 122. DST 124 component, RAA 120, fetches file system object contents and attributes from remote source 122. Furthermore, RAA 120 performs remote source 122 operations comprising: reading contents of a directory at remote source 122, reading object contents from a storage location on SAN disk 118, writing to a file system object on remote source 122, updating a directory on remote source 122 by creating or removing an entry, and reading and updating attributes associated with a file system object on remote source 122. Attributes associated with a fetched remote file system object stored in MDS 100 by RCM 108 and object content is stored directly in a SAN disk 118 at a location previously specified in a content-storage attribute in metadata obtained from RCM 108.

Remote file system objects from remote source 122 are held in a remote container, in which they are organized into a hierarchy with a root directory. A remote container is a local entity of MDS 100 managed by RCM 108. While all remote file system objects from remote source 122 are organized in a hierarchy and thus related to each other, it is not necessary for each to exist as a local copy. A remote file server has the capability to export multiple sub-trees and hence, be locally represented as multiple remote containers in a SAN file system. Cached file system objects and aggregates of related, remote file system objects, known as replicas, are stored in remote containers; a singular difference lies in the local population methods of remote containers holding cache copies versus those holding replicas. RM 106 manages consistency of file system objects that require asynchronous validation. CM 112 performs storage allocation and bookkeeping functions for RCM 108. File system object content is written to and stored in SAN disk 118 via RAA 120 without using MDS 100 as an intermediary.

Finally, to return a requested object to SAN client 102, DST 124 returns control to MDS 100, which allows SAN client 102 to access a local copy of requested data from SAN disk 118. Modifications to file system objects made locally are updated at remote source 122 in accordance with a policy specified in CMF 116. To preserve consistency of local copies of remote data with respect to changes made by external clients, SAN client 102 requests a consistency guarantee from MDS 100. MDS 100 requests a similar guarantee from DST 124, which in turn obtains a consistency guarantee from remote source 122. The protocol in which DST 124 communicates with remote source 122 determines the format and content of a consistency guarantee, for example, a time-based consistency guarantee.

Figure 2A:
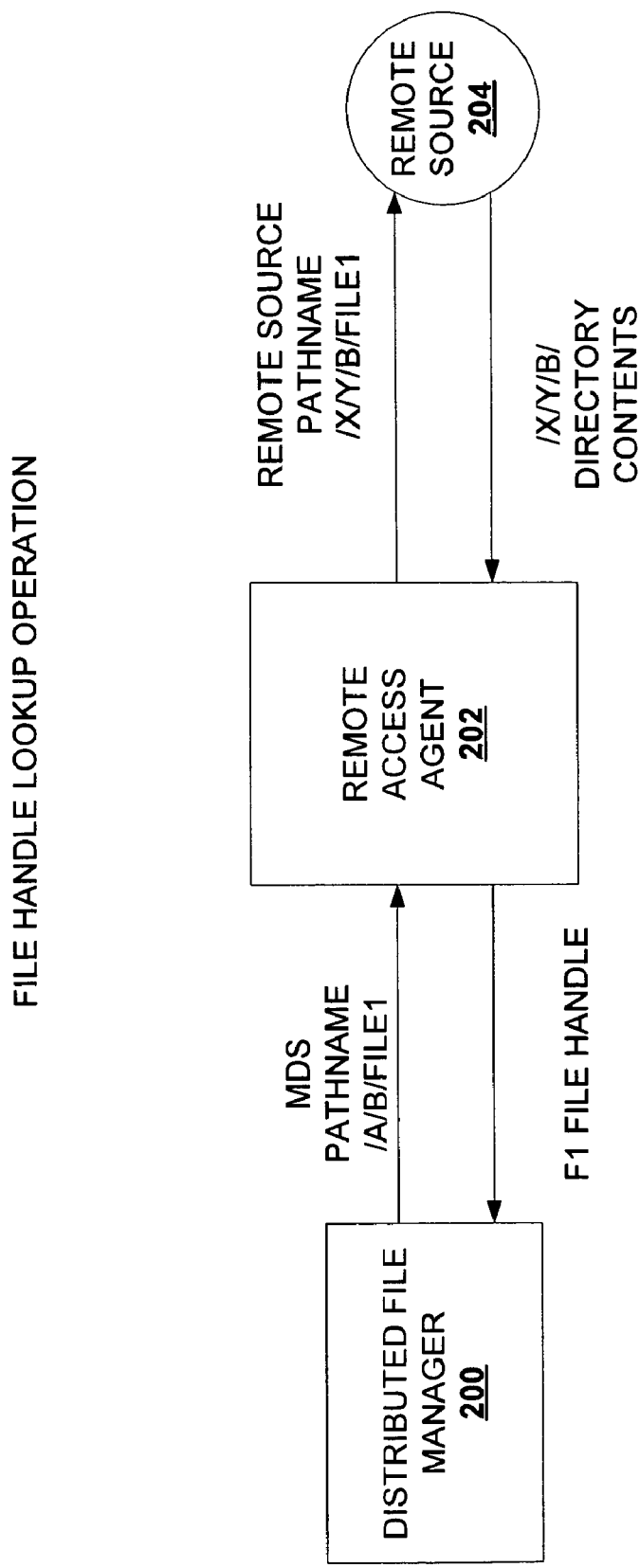
FIGS. 2a-c are data flow diagrams for operations on metadata.
Figure 2B:
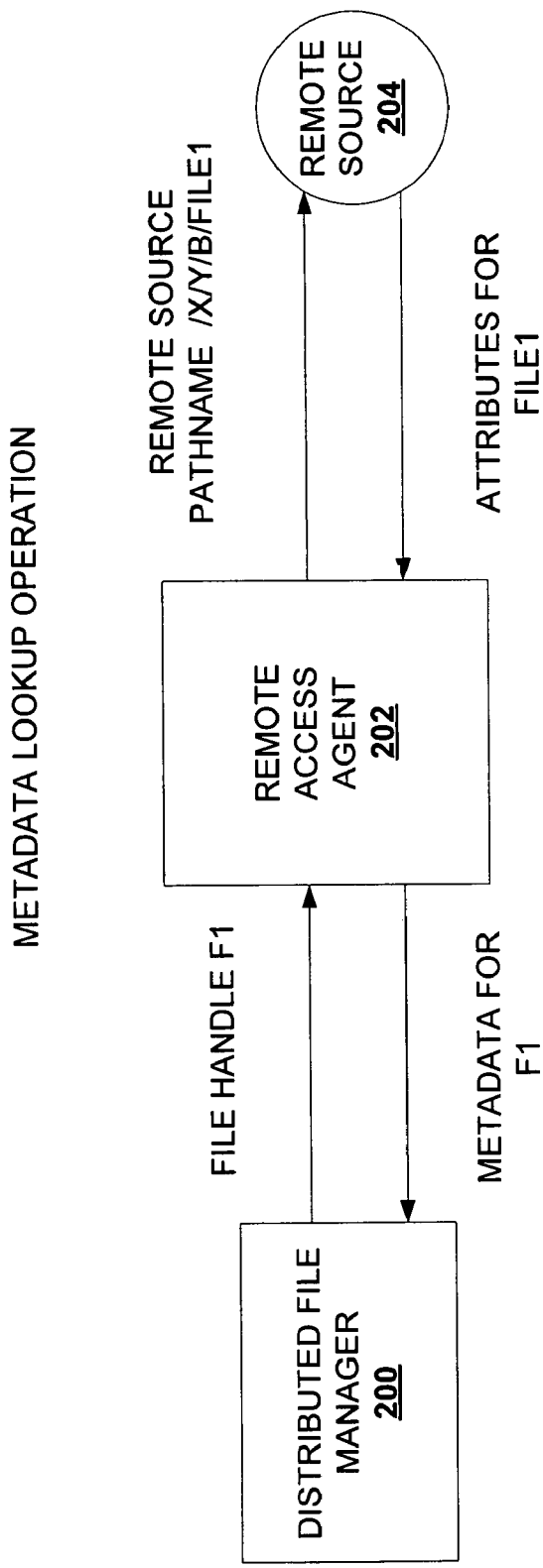
Figure 2C:
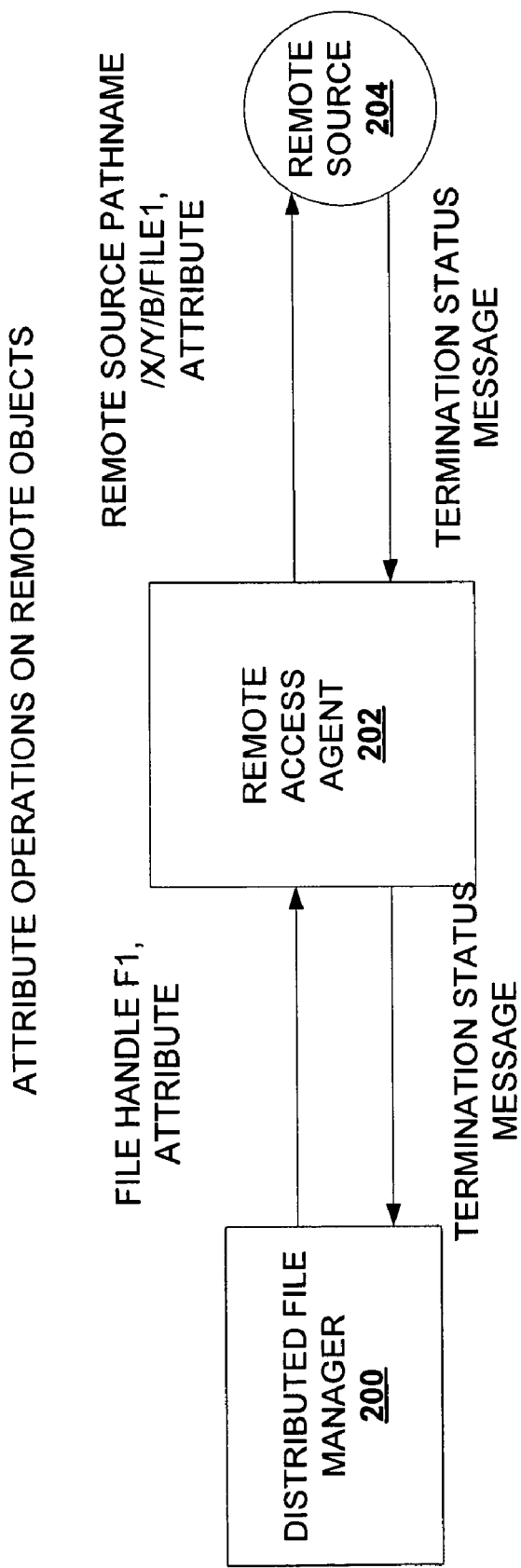

The present invention arranges SAN file system contents in containers, specifically remote containers hold DST-managed data originating from remote sources. Each container comprises one or more directories and each directory further comprises one or more files, attachment points, and symbolic links. A directory contains subsidiary directories, each of which is identified by a name that is unique within its parent directory. The association between a directory name and a file system object is known as a mapping. A single directory within each container is noted as a root directory and is not a subsidiary of any directory within a container. A distinguished container provides a system root for a SAN file system. Other directories in a container are present in exactly one other directory in a given container. These uniqueness rules do not apply to "." and "..", current and parent directories, respectively. An attachment point connects a name in a directory of one container to the root directory of another container. A file system object therefore has a pathname, which is a list of directory names starting with a file system root and traversing directories and container attachments to the last name on a list identifying a file system object. Each file system object also has associated attributes. Of particular interest are file length and content-storage attributes; a block map or storage object identifier can be obtained from the latter. File system object attributes and directory mappings are collectively referred to as metadata and are stored in MDS 100. Prior to direct operations on file system object contents, operations on metadata occur. FIGS. 2a-2c are diagrams illustrating operations utilizing or performed on metadata by MDS involving DFM 200, RAA 202, and remote source 204. In the exemplary figures, communication between DFM 200 and RAA 202 occurs via RPC, communication between RAA 202 and remote source 204 occurs via a network file access protocol dependant on remote source 204, and communication between RAA 202 and SAN disk 206 occurs via SAN disk interface.

In FIG. 2a, DFM 200 requests a lookup operation by contacting RAA 202. RAA 202 obtains as input from DFM 200 a pathname (e.g., /a/b) to a requested file system object. RAA 202 converts local pathname representation from DFM 200 to a pathname representation for a remote source 204. RAA 202 obtains a directory contents listing from remote source 204 and determines if a requested file system object is present. If RAA 202 determines a requested file system object does exist, a handle to the requested file system object is returned to DFM 200.

In FIG. 2b, DFM 200 requests a metadata lookup operation by contacting RAA 202. RAA 202 obtains as input from DFM 200 a file handle, previously obtained from a lookup, to a requested file system object. RAA 202 provides to remote source 204 a converted remote representation of pathname from an input file handle and obtains attributes from remote source 204, for example, the last time the requested file system object was modified. RAA 202 converts attributes received (e.g., a timestamp of the last modification time) from remote source 204 into a representation compatible with DFM 200. Lastly, RAA 202 provides to DFM 200 metadata comprising attributes associated with a requested file system object.

In FIG. 2c, DFM 200 performs metadata operations resulting in modification to a remote source 204 object. DFM 200 provides as input to RAA 202 a file handle and an attribute, which is file length in the exemplary figure. RAA 202 converts a file handle provided as input by DFM 200 to a pathname representation for a remote source 204 and passes it along with a file attribute to remote source 204. Remote source 204 performs operations on the requested file system object given by RAA 202 using as input parameters, attributes provided by RAA 202. Upon completion of requested operations, remote source 204 returns to RAA 202 a termination status message. RAA 202 forwards termination status message to DFM 200.

Figure 2D:
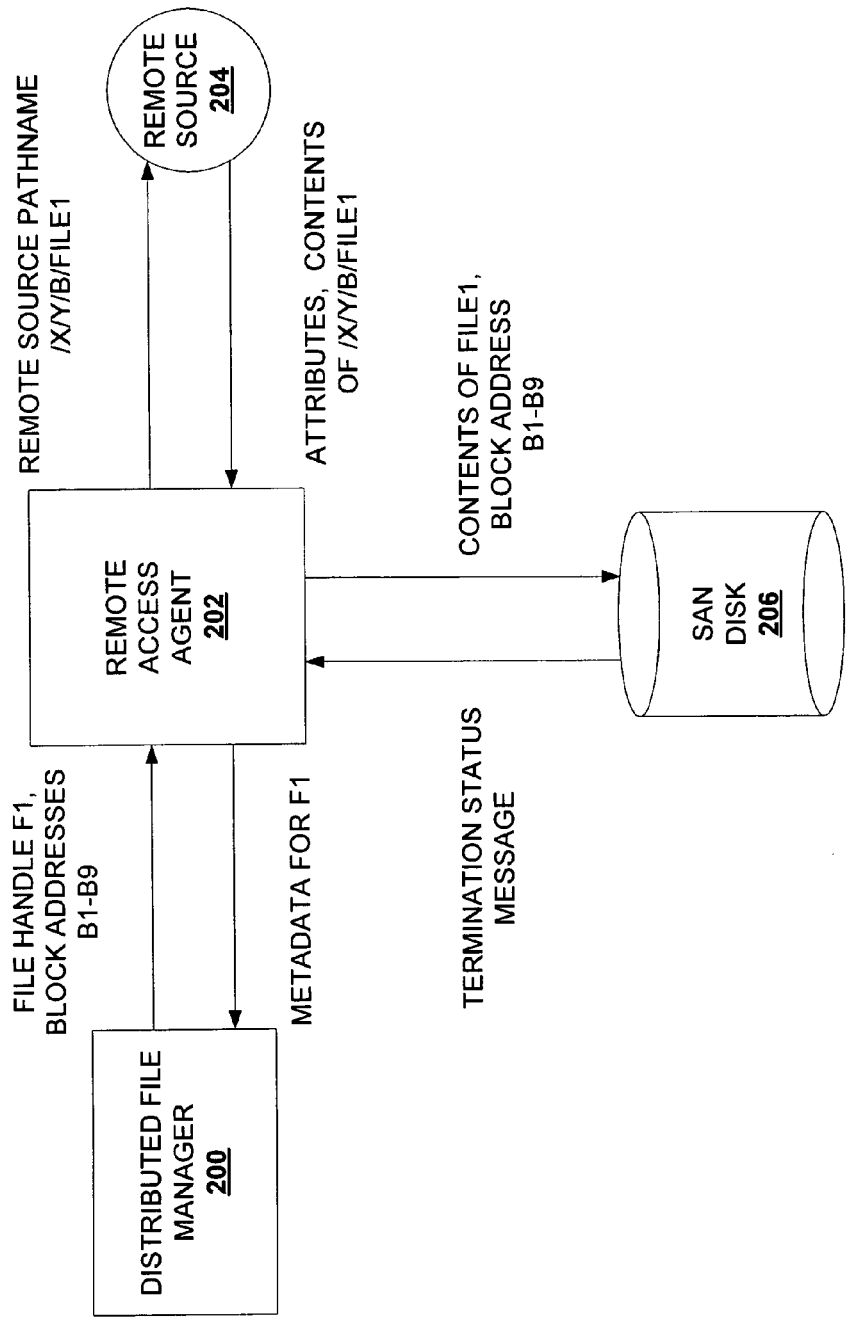
FIGS. 2d-e are data flow diagrams for operations on content data.
Figure 2E:
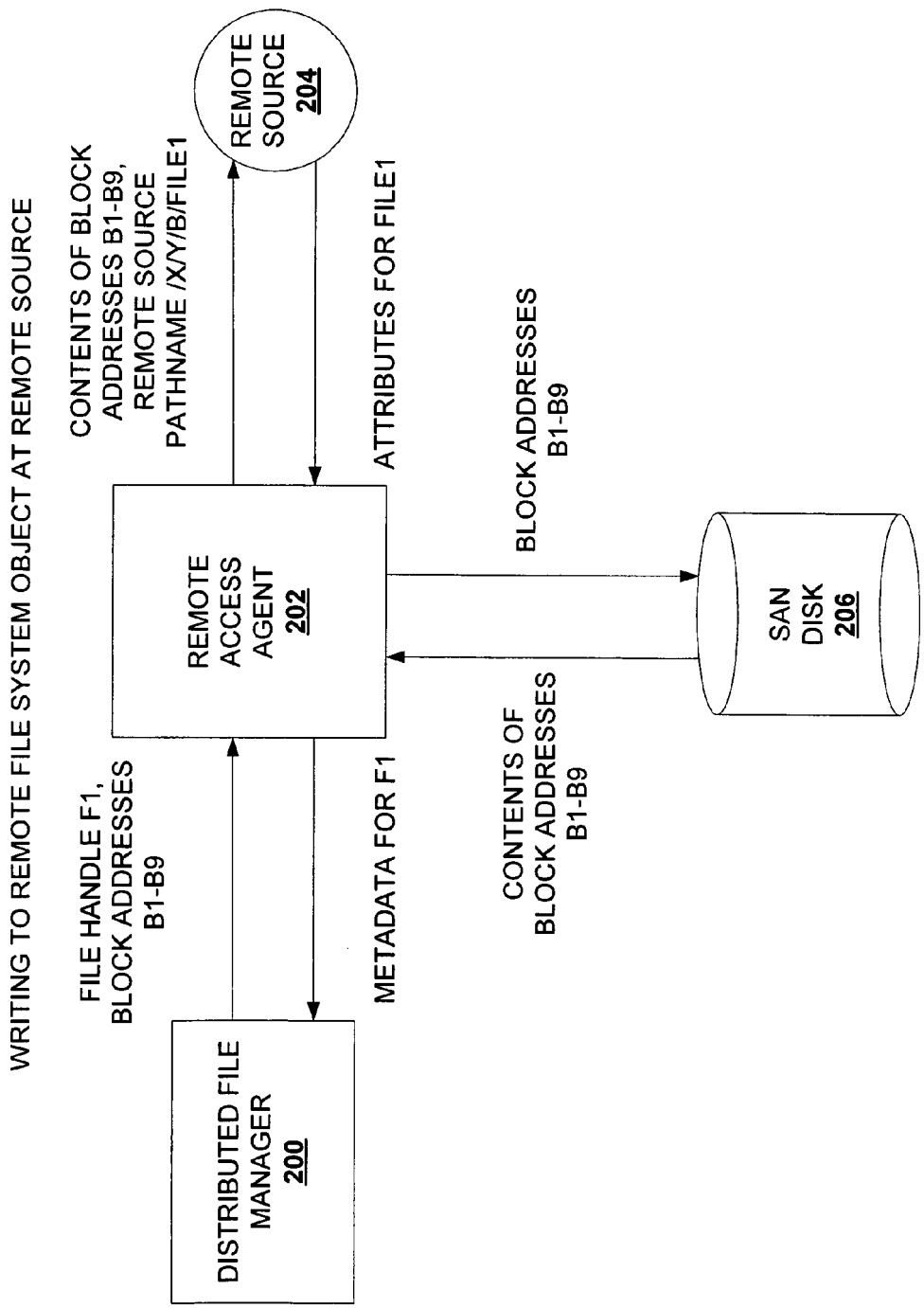

In FIGS. 2d-e, operations on file system object contents are shown. In FIG. 2d, a fetch operation from remote source 204 is performed, thus writing remote data to SAN disk 206. In an exemplary embodiment, wherein environments utilize storage object devices, DFM 200 provides to RAA 202 a file handle, a desired file range, along with an object identifier and an offset. In other embodiments, wherein environments utilize simple block storage devices, an object identifier and offset is replaced by a range of block addresses. RAA 202 then queries remote source 204 for file system object referenced by file handle. Remote source 204 returns to RAA 202 the requested file system object content and associated metadata. RAA 202 passes the requested file system object content and a range of block addresses to SAN disk 206 for storage. SAN disk 206 returns to RAA 202 a termination status message. RAA 202 returns to DFM 200 metadata associated with the requested file system object including, but not limited to, attributes such as file length and modification time.

In FIG. 2e, SAN disk 206 data is written to remote source 204. DFM 200 provides to RAA 202 a file handle to a file system object, a desired range within the requested file system object, and a list of block addresses indicating where the requested file system object is stored in SAN disk 206. RAA 202 forwards to SAN disk 206 a range of block addresses. SAN disk 206 reads data from the provided range of block addresses and sends data to RAA 202. RAA 202 provides data from SAN disk 206 along with a pathname representation for remote source 204 to remote source 204. Remote source 204 returns to RAA 202 metadata (i.e., file system object attributes) associated with the modification, which in turn returns metadata to DFM 200. In the exemplary embodiment, remote source 204 is pathname-based (e.g., FTP). In other embodiments, remote source 204 is handle-based (e.g., NFS).

Figure 3A:
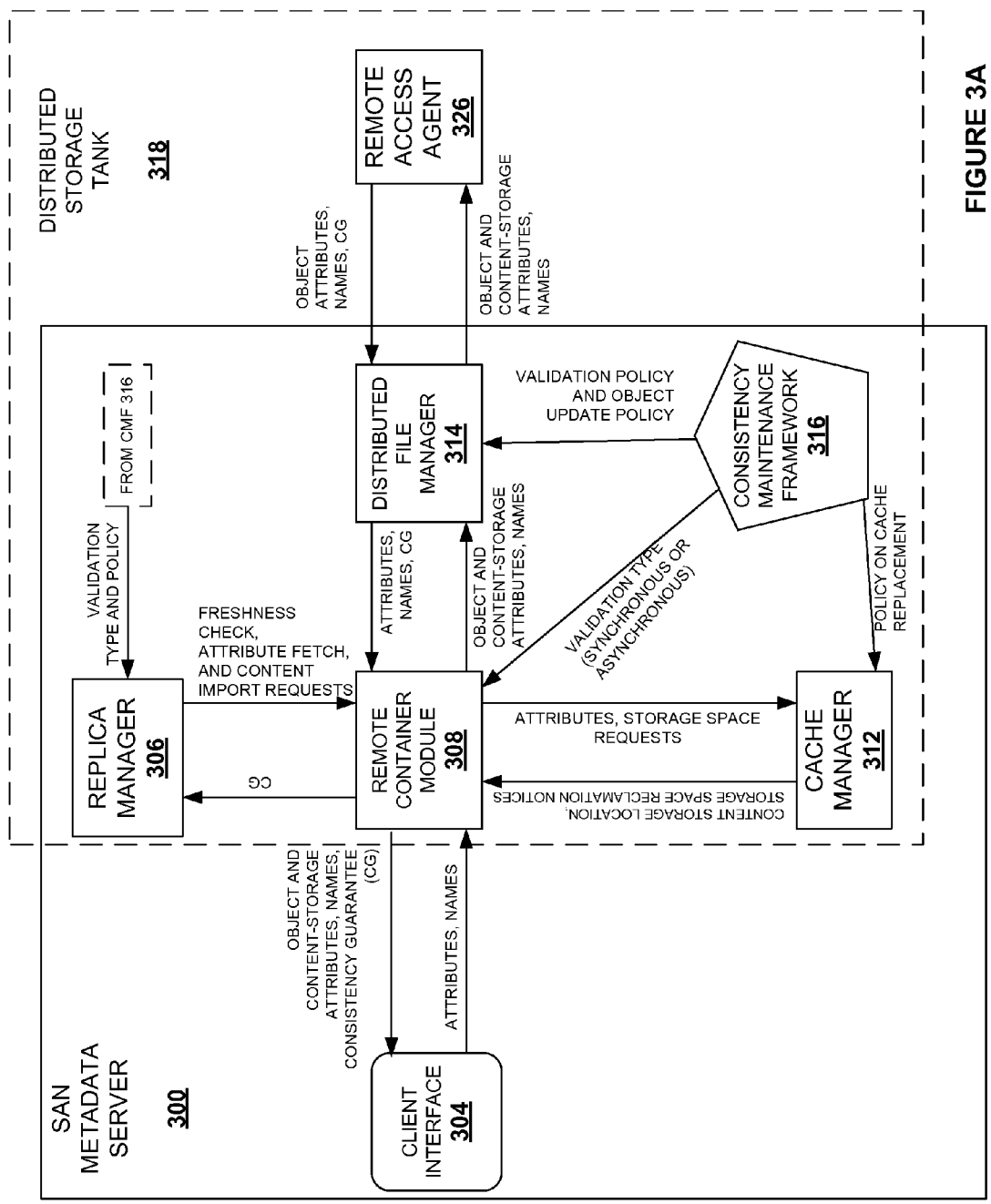
FIGS. 3a-b, collectively, illustrate data flow in a general system diagram of the present invention.
Figure 3B:
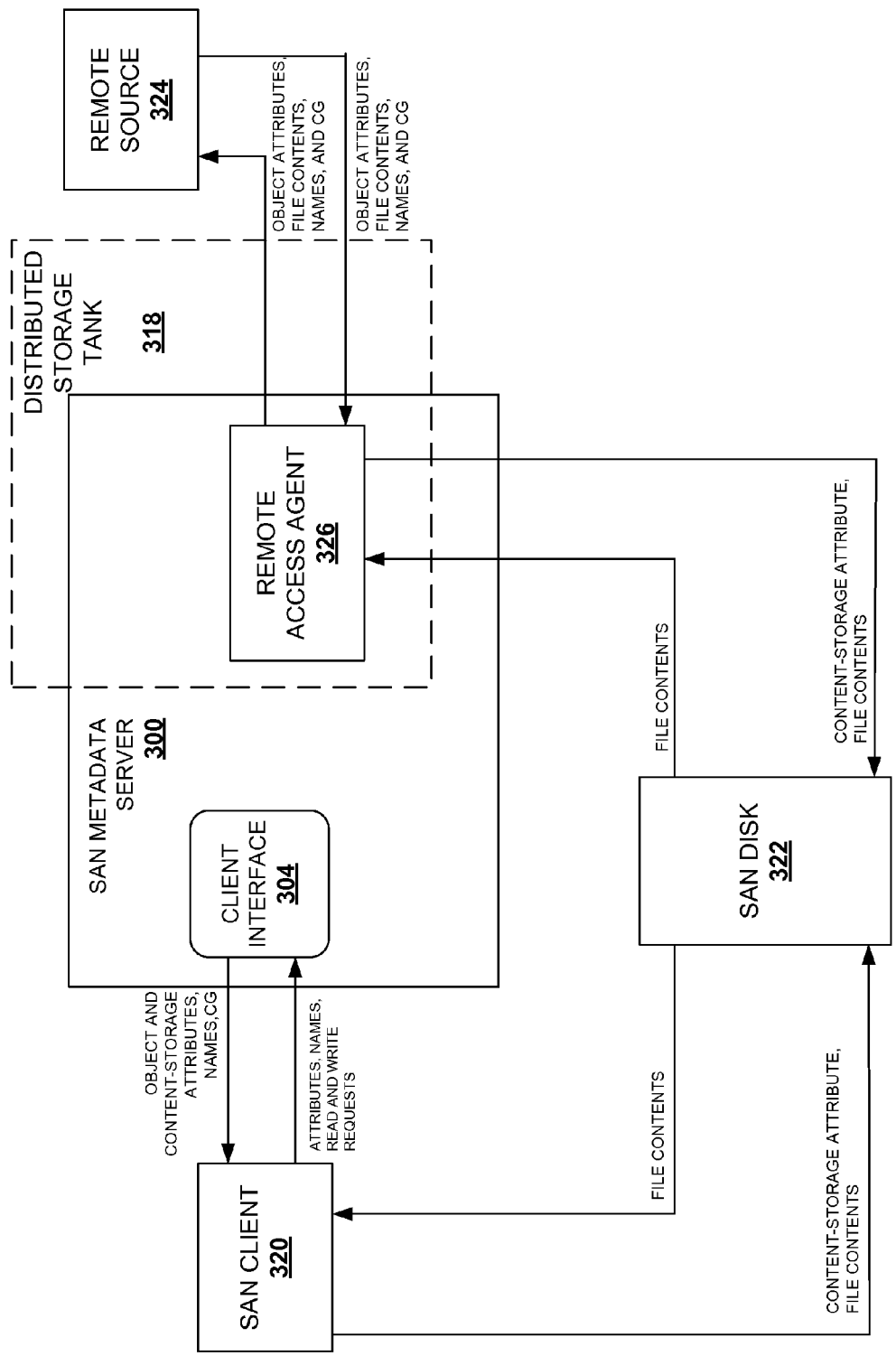

Collectively shown in FIGS. 3a and b, is a general system diagram indicating data flow between MDS 300, DST 318, SAN client 320, SAN disk 322, remote source 324, as well as within MDS 300 and DST 318. SAN client 320 obtains metadata and a consistency guarantee from MDS 300 via client interface 304. SAN client 320 communicates directly with SAN disk 322 via SAN disk interface. To access the contents of a file system object, SAN client 320 uses a content-storage attribute from metadata specifying a storage object identifier or block map obtained from client interface 304 of MDS 300 and reads from or writes to the specified location in SAN disk 322. If SAN client 320 performs a read operation on the identified storage location in SAN disk 322, SAN disk 322 returns to SAN client 320 file contents. SAN client 320 obtains file system data associated with retrieved file contents, from MDS 300. A consistency guarantee provided to SAN client 320 ensures that MDS 300 will provide notification when an object is changed by another SAN client or by a remote source. Consistency guarantees allow a plurality of clients to use file system metadata and file contents simultaneously. Consistency guarantees from MDS 300 are also used to synchronize clients using byte range and open locks; byte range and open locks are a means of coordinating clients reading from and writing to a file.

RCM 308 stores object and content-storage attributes, attributes for validating object contents, and directory mappings, collectively referred to as metadata, pertinent to file system objects stored in remote containers. Client interface 304 of MDS 300 passes to RCM 308 requests received from SAN client 320 for metadata for a file system object, as well as requests for a consistency guarantee or guarantees associated with a requested file system object. RCM 308 obtains a consistency guarantee pertaining to a requested file system object from DFM 314 and relays said consistency guarantee to client interface 304 of MDS 300. Thus, MDS 300 is able to extend equivalent guarantees to requesting SAN client 320. Client interface 304 of MDS 300 is also used by RCM 308 to deliver notification of changes in remote objects received from DFM 314 back to SAN client 320. In one embodiment, SAN client 320 is notified of changes by lock revocation.

CM 312 manages local storage for remote file system object contents. CM 312 supports both caching and replication functions. CM 312 implements a replacement algorithm identifying a subset of remote objects that are to be stored locally. RCM 308 communicates with CM 312 to request storage space for remote file system objects. CM 312 operates on portions of remote object content managed by RCM 308, which are either parts of files, whole files, or entire replicas, depending on a specified level of granularity. Because RCM 308 contains metadata describing the storage of local copies in SAN disks, and thus, determine local copy presence without consulting CM 312, CM 312 also communicates with RCM 308 to indicate the reclamation of storage space and subsequent eviction of stored remote file system objects. Additionally, CM 312 provides a mechanism for attaching to each chunk, pertinent subset of object attributes. Such a subset of object attributes is used by a replacement algorithm for determining the best subset to store. A cache replacement algorithm is influenced by policy input obtained from CMF 316. For example, priorities governing competition for cache space in CM 312 are adjusted in accordance with policy input obtained from CMF 316. Actual block allocation for a storage area governed by CM 312 is handled by MDS 300, specifically by server utilities in MDS Code 110, while an object-based storage system performs block allocation in SAN disk 322.

RM 306 operates in a manner different from that of client interface 104, managing replicas by scheduling the revalidation of their contents. Replicas are well-defined subsets of remote data, which have common policies for validation and update consistency. CMF 316 creates replicas as a result of defining policies on groups, or aggregates, of remote objects. Replica management involves the definition of replicas and the processing of asynchronous validations for local copies of remote file system objects.

DFM 314 communicates with RCM 308 to provide an interface to remote source 324. DFM 314 provides a method for accessing file system objects from remote source 324 and managing consistency guarantees encapsulating protocol-specific details. To implement such a remote data interface, DFM 314 communicates with RAA 326, which implements a protocol necessary to communicate with remote source 324. DFM 314 interface provides methods for operations on directories (e.g., lookup and create), obtaining and modifying file system object attributes, obtaining and returning consistency guarantees, and indirectly reading and writing object contents. While RCM 308 is not affected by protocol-specific details, each implementation of DFM 314 and RAA 326 address the concerns of a single protocol. In one embodiment, RCM 308 connects to a plurality of DFM 314 implementations further connecting to a plurality of RAA 326 implementations. Thus, communication through a plurality of protocols for diverse remote sources 324 is enabled.

CMF 316 records administrative preferences for important aspects of DST 318 behavior. Namely, preferences are consistency policies for validation and update transmission for local copies of remote objects. Validation and update parameters are supplied to DFM 314, while validation type (e.g., asynchronous or synchronous) is supplied to RM 306 and RCM 308. For each file system object in a remote container, a consistency policy is specified and associated. Consistency policies are maintained in CMF 316 along with entries binding consistency policies to file system objects. Consistency policies are independent and reusable objects, while policy entries are keyed by a remote container identifier and a relative pathname of a requested file system object within a keyed remote container. For efficiency of application and specification, consistency policies are defined using a hierarchy of aggregates comprising directories, sub-trees and remote containers. More detailed specifications supersede less detailed specifications that occur at a higher level in a file system hierarchy. Additionally, consistency policies are enabled based on file system object attributes, for example, name and size.

Network file access protocols vary in their provision of support for maintaining the consistency of remote data accessed by a client. To conceal support for varying levels of consistency maintenance from RCM 308, DFM 314 utilizes a mechanism that provides for consistency guarantees by using delegation and callbacks. A delegation corresponds to a consistency guarantee; it is a request to be notified of certain changes. A callback corresponds to such a notification. Delegations are designated for individual file system objects and for aggregates (e.g., directories and entire containers). In one embodiment, a delegation is typed and is applied to a specific operation, thus allowing separate control of read and write access to either metadata or object contents. In another embodiment, a delegation has multiple types and applies to a set of operations on either metadata or object contents. Delegation and callback mechanisms allow network file access protocols providing strong consistency guarantees to be supported without loss of function by mapping these consistency guarantees, while DFM 314 simulates the behavior for network file access protocols providing weaker consistency guarantees. The fidelity of such a simulation is controlled by consistency policy input from CMF 316. Network file access protocols also differ in support for other features, such as file system object attributes. DFM 314 also encapsulates these differences. The separation of functions between DFM 314 and RAA 326 is protocol and implementation dependent.

RAA 326 is invoked by DFM 314 to contact a requested remote data source 324. RAA 326 provides for reading file system object contents and attributes from remote source 324, returning of metadata to DFM 314, writing of file contents to SAN disk 322, and managing authentication and protocol state for DFM 314. A key feature of RAA 326 interface with DFM 314 is the abstraction of file contents from MDS 300. Rather than handling file contents, DFM 314 provides as input to RAA 326 a content-storage attribute (e.g., storage object identifier and offset, range of block addresses) indicating a location in SAN disk 322 in which requested file contents are stored. RAA 326 either writes received remote file contents to specified block addresses or reads from block addresses on SAN disk 322 locally modified file content. RAA 326 performs a read operation when locally modified content from specified block addresses is to be exported to remote source 324 from which it initially originated.

Consistency Maintenance Process Flow—Freshness Check and Fetching

The task of consistency management is shared between RCM 308, DFM 314, and CMF 316. Referring now to FIG. 4, a process for maintaining the consistency of local copies of remote data with respect to remote source 324 is shown. In step 400, a freshness check of metadata by RCM 308, specifically object attributes, is triggered synchronously, by SAN client 320 access, or asynchronously, by a background RM 306 process. If a consistency guarantee exists for a referenced local copy, it is determined whether object data content is requested in step 402. Specifically, it is determined whether a SAN client triggered access. If in step 402, it is determined that object content is not requested, a referenced local copy is determined to be consistent and the process ends with step 404. Otherwise, the process proceeds to step 500.

If a consistency guarantee for a referenced local copy does not exist, attributes corresponding to referenced local copy of remote data are requested from DFM 314 in step 406. Subsequently, in step 408 remote object attributes are fetched from remote source 324. If an existing, revoked consistency guarantee for a referenced local copy is notification-based, a new consistency guarantee is obtained from remote source 324 in step 410. Otherwise, if it is time-based, a local timer is set in step 412. A time-based consistency guarantee is automatically revoked when the time interval set by a local timer has passed, whereas a notification-based consistency guarantee remains in effect until it is revoked upon receipt of an explicit notification from remote source 324. The process proceeds to step 414 where newly fetched attributes are merged with previous attributes. Merged attributes may cause the invalidation of directory or file content. For example, if a modification time attribute of a file has changed, associated data content is invalidated.

The process returns to step 402, where it is determined whether object contents of a referenced local copy have been requested; if such is the case, object content is validated in step 500. Otherwise, the process terminates with step 404.

Asynchronous and synchronous methods of validation are compatible with each other and thus, it is possible to specify both methods of validation in a single, hybrid policy. In one embodiment, asynchronous, synchronous, and hybrid policy types specified for different remote containers operate simultaneously within a single instantiation of MDS 300. For synchronous validation, RCM 308, connected to client interface 304, intercepts references to local copies of remote objects and performs validation before allowing requested data content or attributes to be returned to SAN client 320. When synchronous validation is not specified, MDS 300 is connected to a local copy through a null remote container module and asynchronous validation occurs as a background process, namely, as a background RM 306 process.

Consistency Maintenance Process Flow—Validation

Figure 5:
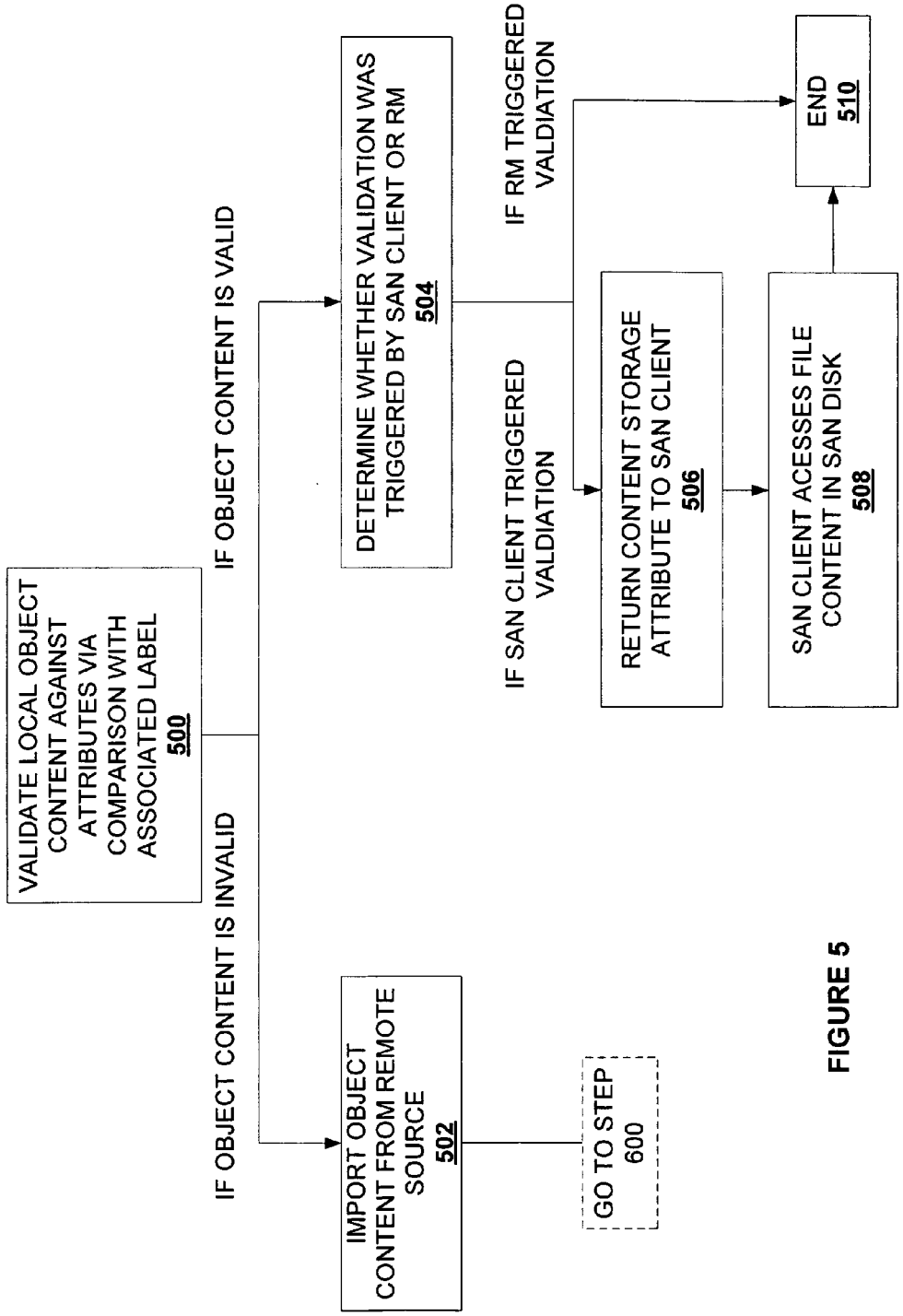
FIG. 5 is a validation process flow diagram, also illustrating SAN client access to requested content.
Figure 6:
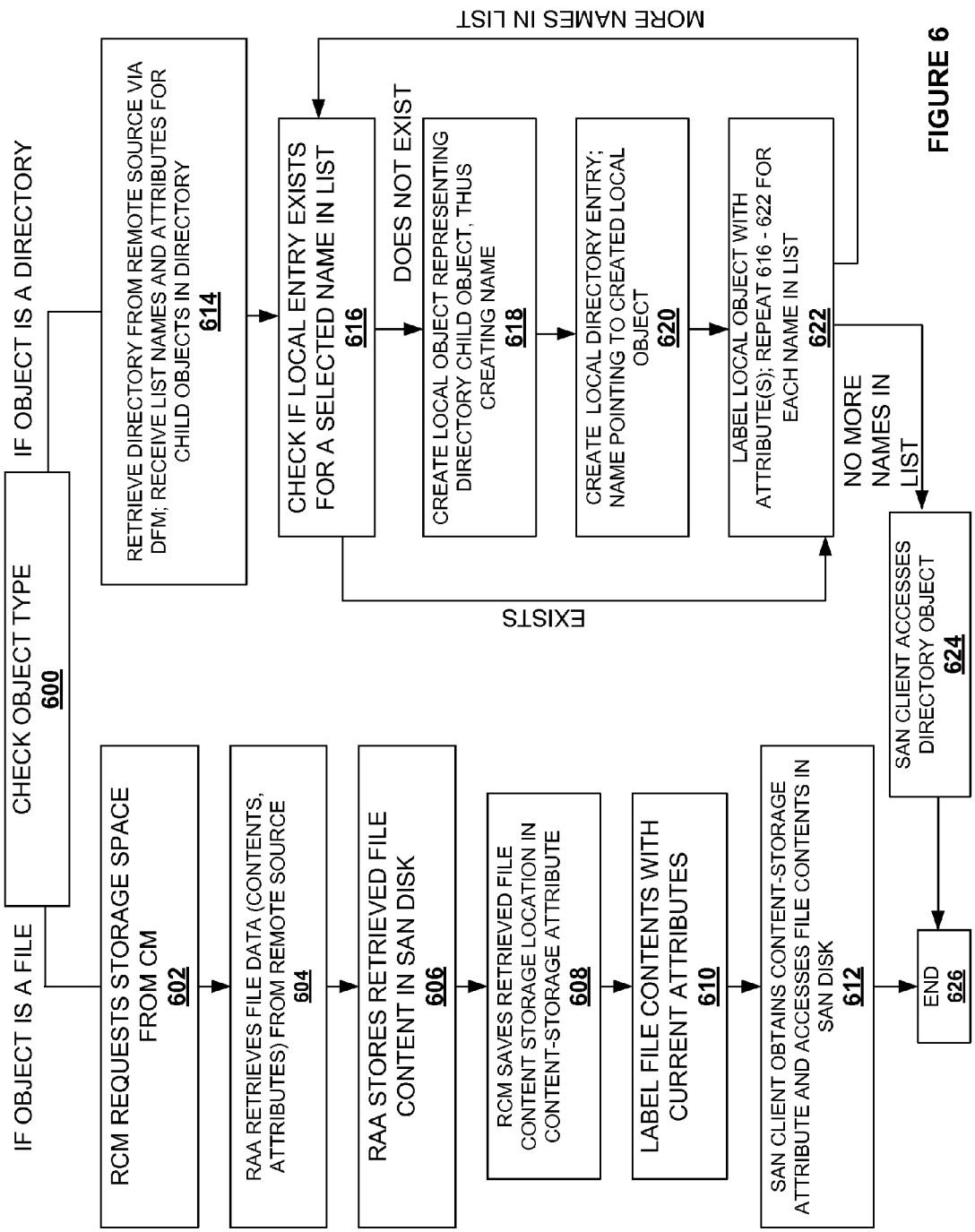
FIG. 6 is a process flow diagram illustrating object content importation from a remote source, also illustrating SAN client access to requested content.

Referring now to FIG. 5, a process for validating local copies of remote object content is shown. Before the start of the process, each remote file system is mapped to a remote container and remote directory structure of remote file system is mirrored locally. In step 500, local copies of remote object content are validated by a comparison performed by RCM 308 between current file or directory validation attributes (e.g., modification time, change attribute) with file or directory attribute labels associated with a referenced object when it was last retrieved. The process proceeds to step 502 if a comparison indicates that object content is invalid. In step 502, remote content importation from remote source 324 is initiated. Subsequently, the process proceeds to step 600 to continue on with an object content importation process. If comparison in step 500 reveals valid object content, it is determined in step 504 whether validation was triggered by SAN client 320 or by RM 306. If it is determined in step 504 that SAN client 320 referenced an object and requested content, RCM 308 returns a content-storage attribute to SAN client 320 in step 506. Subsequently, in step 508, SAN client 320 accesses storage location in SAN disk 322 indicated by content-storage attribute. Validation and accessing process terminates in step 510. If RM 306 triggered validation, the process terminates with step 510.

Differences between remote directory structure and local containers, such as non-resident files, are rectified upon demand by RCM 308 such that objects represented in a container appears the same as SAN-resident data. If a referenced file system object is invalid or non-resident, referenced file system object content and metadata comprising directory mappings and attributes are obtained from remote source 324.

Consistency Maintenance Process Flow—Object Importation Process

In step 600, the type (e.g., file, directory) of an invalid object is checked. If it is determined that SAN client 320 has requested a content storage attribute (e.g., storage object identifier and offset, range of block addresses) for non-resident or invalid file contents, RCM 308 is invoked to request storage space from CM 312 in step 602. If sufficient storage space currently exists, step 602 is bypassed; this information is determined from metadata comprising file length and content-storage attributes. The process continues to step 604 where RAA 326, invoked by DFM 314, retrieves requested file data comprising file contents and associated attributes from remote source 324. RAA 326 stores retrieved file contents in SAN disk 322 in a storage location designated by RCM 308 in step 606. In step 608, RCM 308 writes the storage location in which file content was stored to a content-storage attribute in metadata corresponding to retrieved file data content. The process continues with step 610 where retrieved file contents are labeled with current file attributes, and thus, file content importation portion of the process is complete. In step 612 SAN client 320 obtains content-storage attribute from RCM 308 and accesses valid file content on SAN disk 322. In step 626, the process terminates.

Returning to type-checking step 600, if invalid object is of directory type, the process proceeds to step 614 where a requested directory is retrieved from remote source 324 via DFM 314. Remote source 324 returns a list of names and attributes for each child object in a directory sub-tree. In step 616, it is determined whether a local entry exists for a name selected from list returned in step 614. If such an entry does exist, the process proceeds to step 622; otherwise, the process proceeds to step 618 where a local object is created to represent a child object referred to by a name chosen in step 616. A local name is also associated with a newly created local object. Continuing to step 620, a local entry mapping local name to local object is created in a local directory for a new object. In step 622, which follows directly after step 616 if a local entry for already exists for a selected name, newly created local object is labeled with attributes associated with a child object it represents. The process returns to step 616 and repeats steps 616 through 622 for each name in list. After each name in list has been visited, directory content importation portion of the process is complete. The process continues to step 624 in which SAN client 320 accesses a requested, valid directory object in 624, and the process terminates in step 626.

A retrieved file system object is also accompanied by a consistency guarantee for a requested file system object, or a larger aggregate containing a consistency guarantee for a requested file system object. RCM 308 retains a consistency guarantee to ensure the continuity of file system object validity. Because file system object metadata is necessary to represent local storage details of file system object contents, it is necessary to purge file system object contents from local storage before corresponding metadata is purged. DFM 314 is used to request directory mappings and attributes for objects individually (e.g., by looking up a single pathname) or in bulk (e.g., by reading an entire directory). Results of a request from DFM 314 are converted into a form compatible with SAN file system metadata representation by RCM 308 of a data importation process.

Consistency Maintenance Process Flow—Object Exportation Process

Referring now to FIG. 7, a process for exporting data to remote source 324 is shown. In step 700, modifications made by SAN client 320 are detected by RCM 308, and local copies of file system objects comprised of metadata, directory mappings, and file contents are marked in a manner indicating that modifications have been made. Modifications to file system objects are protected by a consistency guarantee allowing such changes.

If modifications to local copy marked in step 700 affect file contents, exportation process continues to step 702. In step 702, RAA 326 obtains metadata comprising a content storage attribute and file attributes corresponding to a modified local copy from RCM 308 via DFM 314. In step 704, RAA 326 retrieves file content stored in SAN disk 322 at location indicated by obtained content-storage attribute. RAA 326 exports file content and file attributes to remote source 324, as shown in step 706. A schedule determining the frequency and time interval at which modification updates are sent to a remote source is dependant on an update consistency policy setting. Update consistency policy configurations are defined by a delay (i.e. write-behind), which may be zero (i.e. write-through), or by using a method of delegation in which a remote source agrees to notify RCM 308 via RAA 326 and DFM 314, when remote source 324 requires an update. These considerations control the delay between the time at which a file system object is modified and when modification updates are sent back to a remote source. In one embodiment, delegation is used to provide single system image semantics. Continuing to step 708, remote source 324 returns remote file attributes and a consistency guarantee to RAA 326, which is subsequently returned as metadata for storage in MDS 300 by RAA 326 to RCM 308 via DFM 314. File content exportation process terminates in step 718.

If modifications to marked local copy in step 700 affect metadata, directory content exportation process continues to step 710 where RAA 326 obtains changed directory entries from RCM 308 via DFM 314 for marked local copies. In step 712, RAA extracts from directory entries and reformats, a name and a mapping corresponding to a local directory. Following in step 714, RAA 326 exports directory attributes and name changes obtained in step 712. Proceeding step 716, remote source 324 returns remote directory attributes and a consistency guarantee to RAA 326, which is returns directory attributes and a consistency guarantee as metadata for storage in MDS 300 by RAA 326 to RCM 308 via DFM 314. Directory exportation process terminates in step 718.

Remote Access Agent

RAA 326 handles protocol-specific details necessary to manage communications with a remote source. RAA 326 implements network file access protocols used to communicate with remote source 324 and directs transfer of file content between remote sources and SAN disks. A key feature of RAA 326 interface with DFM 314 is that it allows RCM 308 to avoid handling file contents. Instead, DFM 314 passes a content-storage attribute (e.g., storage object identifier and offset, range of black address) obtained from CM 312 to RAA 326. RAA 326 uses block addresses to write to SAN disk 322 contents of remote file system objects it receives, as well as to read locally modified data from SAN disk 322 and send it to remote source 324.

RAA 326 code is linked with library code that allows data transfer to and from remote source 324 using a variety of network file access protocols. In one embodiment, RAA 326 implementation is specialized for given network file access protocols and specific remote sources. Data transfer is accomplished by making direct calls to network file access client code and by making file input/output (I/O) system calls to a remote operating system kernel. RAA 326 is indistinguishable from a typical network file access client from the perspective of remote source 324. RAA 326 also utilizes consistency mechanisms supported by network file access protocol and maintains these mechanisms in proxy for its caller, namely DFM 314. RAA 326 also acts as a security proxy for SAN client 320. Depending on the security protocol in use, RAA 326 receives credentials for a particular user and uses them as necessary to perform authentication. In this manner, authorization to perform a particular file operation is obtained.

In one embodiment, several agents are instantiated, allowing for an improvement in throughput and parallelism. In another embodiment, an agent is implemented with internal parallelism; it is comprised of sub-agents implemented on a plurality of distinct machines. The separation of the DFM 314 and RAA 326 necessitates inter-process communication between machines hosting each module. Because DFM 314 interface uses function calls and callbacks, an RPC connection or connections allowing bi-directional calls are necessary.

Additionally, RAA 326 makes provisions for reading and writing metadata and file contents, as well as managing authentication and protocol state for DFM 314. RAA 326 acts as a data-handling proxy serving as an intermediary between MDS 300, remote source 324, and SAN disk 322. A protocol-specific implementation of RAA 326 is invoked by DFM 314 to initiate communications with remote source 324. DFM 314 selects an implementation of RAA 326 based on source remote container and RAA 326 configuration. DFM 314 sends requests to RAA 326; RAA 326 receives requests and identifies appropriate remote host, protocol, and user authentication for communication. In one embodiment, RAA 326 responds immediately by providing a file system object handle for a known path. Otherwise, RAA 326 sends request to remote source 324 and processes returned response. Depending on network file access protocol, local protocol state is also managed by RAA 326. Local protocol state processing is comprised of maintenance of: file handle and lock owner identifiers, sequence numbers for serializing operations, and callbacks for consistency management.

Additionally, the present invention provides for an article of manufacture comprising computer readable program code contained within implementing one or more modules to locally store, share, and maintain remote file system data. Furthermore, the present invention includes a computer program code-based product, which is a storage medium having program code stored therein which can be used to instruct a computer to perform any of the methods associated with the present invention. The computer storage medium includes any of, but is not limited to, the following: CD-ROM, DVD, magnetic tape, optical disc, hard drive, floppy disk, ferroelectric memory, flash memory, ferromagnetic memory, optical storage, charge coupled devices, magnetic or optical cards, smart cards, EEPROM, EPROM, RAM, ROM, DRAM, SRAM, SDRAM, or any other appropriate static or dynamic memory or data storage devices.

Implemented in computer program code based products are software modules for: (a) storing structured local copies of remote data; (b) storing metadata pertaining to said remote data; (c) validating local copies; (d) accessing local copies utilizing said metadata; (e) importing data from a remote source when changes to remote data occur; and (f) exporting data to a remote source when changes to local copies occur.

CONCLUSION

A system and method has been shown in the above embodiments for the effective implementation of a remote access agent for caching in a SAN file system. While various preferred embodiments have been shown and described, it will be understood that there is no intent to limit the invention by such disclosure, but rather, it is intended to cover all modifications falling within the spirit and scope of the invention, as defined in the appended claims. For example, the present invention should not be limited by software/program or specific computing hardware.

The above enhancements are implemented in various computing environments. For example, the present invention may be implemented on a multi-nodal system (e.g., LAN, SAN, WAN, MAN) or networking system (e.g., Internet, WWW). All programming and data related thereto are stored in computer memory, static or dynamic, and may be retrieved by the user in any of: conventional computer storage and display (i.e., CRT). The programming of the present invention may be implemented by one of skill in the art of object-oriented and network programming.

The invention claimed is:

1. An article of manufacture comprising a non-transitory computer readable medium having computer readable program code embodied therewith to implement a method for maintaining consistency, in a Storage Area Network (SAN), of a local copy of a remote file system sub-tree obtained from a remote source; said medium comprising:

a. computer readable program code mapping a directory structure of said remote file system sub-tree to a container; said container attached to said SAN;

b. computer readable program code representing each remote object comprising said remote file system sub-tree as a local object component of said container;

c. computer readable program code labeling each said local object component with attributes associated with said represented remote object, said attributes comprising both content storage attributes and file attributes, each file attribute comprising at least a time stamp;

d. computer readable program code storing metadata comprising both said content storage attributes and said file attributes in a metadata server, said metadata server attached to said SAN and remotely located from said remote file system;

e. computer readable program code associating a consistency policy with each said local object component in said container; said policy defining conditions for checking freshness of each said labeled object component that is labeled with said content storage attributes and file attributes; and f. computer readable program code checking said metadata server for freshness of each labeled attribute according to at least an associated time stamp and updating each said local object component of said container in accordance with said consistency policy.

2. The article of manufacture of claim 1, wherein said local object components are hierarchically structured within said container in a manner corresponding to hierarchical structure of said remote objects comprising said remote file system sub-tree.

3. The article of manufacture of per claim 1, wherein said local and remote objects both represent either of: a directory or a file.

4. The article of manufacture of claim 3, wherein when said local object component represents a directory, said local object component comprises at least a directory entry and directory attributes; and when said local object component represents a file, said local object component comprises at least file content and file attributes.

5. The article of manufacture of claim 4, wherein said metadata is comprised of at least a local object component attribute and a consistency guarantee, said located object component comprising either a content storage attribute, when said local object component is a file, or at least one directory entry, when said local object component is a directory.

6. The article of manufacture of claim 5, wherein representing of said remote object as a local object component comprises:

when said local object component represents a file, storing said file content at a physical location specified by said content storage attribute; and when said local object component represents a directory, populating said local object component with said directory entries.

7. The article of manufacture of claim 5, wherein said freshness checking comprises:

triggering a check of said attributes associated with each said local object component;

checking for the existence of said metadata defining a consistency guarantee for said local object component;

fetching from said remote source, attributes associated with said remote object represented by said local object component, based on results of said checking step;

creating a consistency guarantee for said local object component, based on results of said fetching step; and merging said fetched attributes with said attributes associated with said local object component.

8. The article of manufacture of claim 7, wherein said check of attributes is triggered by either of: synchronous or asynchronous methods.

9. The article of manufacture of claim 7, wherein said fetched attributes are accompanied by either of: an explicit or an implicit consistency guarantee.

10. The article of manufacture of claim 9, wherein said implicit consistency guarantee exists for a pre-determined period of time.

11. The article of manufacture of claim 9, wherein said explicit consistency guarantee exists until notification is received from said remote source.

12. The article of manufacture of claim 7, wherein said freshness checking further comprises determining validity of said local object content by comparing said fetched attributes with said attributes associated with each said local object component, based on results of said checking step; said comparison validating said local object component if said attributes associated with each said local object component matches attributes of said local content, else invalidating said local object content.

13. The article of manufacture of claim 7, wherein said local object component is updated with modifications made to a remote object imported from said remote source.

14. The article of manufacture of claim 7, wherein said remote object is updated with modifications made to a local object component exported to said remote source.

15. A system for updating, storing and accessing in a storage area network(SAN), a local copy of a remote file system sub-tree obtained from a remote source; said system comprising:

a processor; and computer storage, said computer storage storing:

computer readable program code executed by said processor to map a directory structure of said remote file system sub-tree to a container; said container attached to said SAN;

computer readable program code executed by said processor to represent each remote object comprising said remote file system sub-tree as a local object component of said container;

computer readable program code executed by said processor to label each said local object component with attributes associated with said represented remote object, said attributes comprising both content storage attributes and file attributes, each file attribute comprising at least a time stamp;

computer readable program code executed by said processor to store metadata comprising both said content storage attributes and said file attributes in a metadata server, said metadata server attached to said SAN and remotely located from said remote file system;

computer readable program code executed by said processor to associate a consistency policy with each said local object component in said container; said policy defining conditions for checking freshness of each said labeled object component that is labeled with said content storage attributes and file attributes; and computer readable program code executed by said processor to check said metadata server for freshness of each labeled attribute according to at least an associated time stamp and update each said local object component of said container in accordance with said consistency policy.

16. The system of claim 15, wherein said local object components are hierarchically structured within said container in a manner corresponding to hierarchical structure of said remote objects comprising said remote file system subtree.

17. The system of claim 15, wherein said local and remote objects both represent either of: a directory or a file.

18. The system of claim 17, wherein when said local object component represents a directory, said local object component comprises at least a directory entry and directory attributes; and when said local object component represents a file, said local object component comprises at least file content and file attributes.

19. The system of claim 18, wherein said metadata is comprised of at least a local object component attribute and a consistency guarantee, said located object component comprising either a content storage attribute when said local object component is a file or at least one directory entry when said local object component is a directory.

20. The system of claim 19, wherein representing of said remote object as a local object component comprises:
when said local object component represents a file, storing said file content at a physical location specified by said content storage attribute; and
when said local object component represents a directory, populating said local object component with said directory entries.

21. The system of claim 19, wherein said freshness checking comprises:
triggering a check of said attributes associated with each said local object component;
checking for the existence of said metadata defining a consistency guarantee for said local object component;
fetching from said remote source, attributes associated with said remote object represented by said local object component, based on results of said checking step;
creating a consistency guarantee for said local object component, based on results of said fetching step; and
merging said fetched attributes with said attributes associated with said local object component.

22. The system of claim 21, wherein said check of attributes is triggered by either of: synchronous or asynchronous methods.

23. The system of claim 21, wherein said fetched attributes are accompanied by either of: an explicit or an implicit consistency guarantee.

24. The system of claim 23, wherein said implicit consistency guarantee exists for a pre-determined period of time.

25. The system of claim 24, wherein said explicit consistency guarantee exists until notification is received from said remote source.

* * * * *